United States Patent
Okita et al.

(10) Patent No.: US 8,570,448 B2
(45) Date of Patent: Oct. 29, 2013

(54) LIQUID CRYSTAL SHUTTER, DRIVING METHOD OF THE SAME AND IMAGE DISPLAY SYSTEM

(75) Inventors: Mitsutaka Okita, Toyama-ken (JP);
Shigesumi Araki, Ishikawa-ken (JP);
Emi Higano, Ishikawa-ken (JP)

(73) Assignee: Japan Display Central Inc., Fukaya-shi (JP)

( * ) Notice: Subject to any disclaimer, the term of this patent is extended or adjusted under 35 U.S.C. 154(b) by 245 days.

(21) Appl. No.: 12/965,237

(22) Filed: Dec. 10, 2010

(65) Prior Publication Data
US 2011/0141382 A1    Jun. 16, 2011

(30) Foreign Application Priority Data
Dec. 11, 2009    (JP) .................................. 2009-282054

(51) Int. Cl.
*G02F 1/1335*    (2006.01)
(52) U.S. Cl.
USPC ............................................................ 349/8
(58) Field of Classification Search
USPC .............................................................. 349/8
See application file for complete search history.

(56) References Cited

U.S. PATENT DOCUMENTS

2010/0149636 A1*    6/2010    MacNaughton et al. ..... 359/477

FOREIGN PATENT DOCUMENTS

| JP | 10-191399 | 7/1998 |
| JP | 2000-275575 | 10/2000 |
| JP | 2007-110683 | 4/2007 |

OTHER PUBLICATIONS

U.S. Appl. No. 13/074,507, filed Mar. 29, 2011, Miki et al.

* cited by examiner

*Primary Examiner* — Phu Vu
(74) *Attorney, Agent, or Firm* — Oblon, Spivak, McClelland, Maier & Neustadt, L.L.P.

(57) ABSTRACT

In one embodiment, a liquid crystal shutter includes a first liquid crystal panel for left eye and a second liquid crystal panel for right eye. Each liquid crystal panel includes a pair of electrode substrates and a liquid crystal layer held between the electrode substrates. A driving circuit switches the first and second liquid crystal panels between a transmissive state and a non-transmissive state by turns by applying a voltage to the first and second liquid crystal panels while inversing the polarity of the voltage applied between the pair of the electrode substrates at least once during a period in the transmissive state.

25 Claims, 11 Drawing Sheets

LIQUID CRYSTAL SHUTTER, DRIVING METHOD OF THE SAME AND IMAGE DISPLAY SYSTEM

CROSS-REFERENCE TO RELATED APPLICATION

This application is based upon and claims the benefit of priority from prior Japanese Patent Application No. 2009-282054, filed Dec. 11, 2009, the entire contents of which are incorporated herein by reference.

FIELD

This invention relates to a liquid crystal shutter, a driving method of the same and an image display system.

BACKGROUND

In recent years, various technologies for displaying a three-dimensional image are proposed. As the above-mentioned technology, the three-dimensional image display technology, for example, using a liquid crystal shutter of an active shutter type and display devices such as a liquid crystal display device etc. of a time sharing type is known (for example, refer to Japanese Laid Open Patent Applications (1) to (3)).

Japanese Laid Open Patent Applications No. H10-191399 . . . (1)

Japanese Laid Open Patent Applications No. 2000-275575 . . . (2)

Japanese Laid Open Patent Applications No. 2007-110683 . . . (3)

The liquid crystal display device displays the image for left eye and the image for right eye by turns. The liquid crystal shutter switches a liquid crystal panel for right eye and a liquid crystal panel for left eye to a transmissive state (ON) or a non-transmissive state (OFF) corresponding to the displayed images in the liquid crystal display device.

While the liquid crystal display device displays the image for left eye, the light emitted from the liquid crystal display device penetrates the liquid crystal panel for left eye, and is shut in the liquid crystal panel for right eye. Similarly, while the liquid crystal display device displays the image for right eye, the light emitted from the liquid crystal display device penetrates the liquid crystal panel for right eye, and is shut in the liquid crystal panel for left eye. Thereby, the user wearing the liquid crystal shutter watches the image for right eye and the image for left eye by turns by right and left eyes, and the two-dimensional images displayed on the liquid crystal display can be perceived as a three-dimensional image.

Although chromaticity of the three-dimensional image is decided with the liquid crystal display device and the liquid crystal panel for the liquid crystal shutter, the liquid crystal panel for the liquid crystal shutter is not equipped with a color filter generally. For this reason, it is necessary to adjust the chromaticity of the three-dimensional image by adjusting applied voltages when the liquid crystal panels for left eye and for right eye are turned on.

By the way, in the liquid crystal shutter, precipitous region of the transmissivity change in response to the applied voltage is used depending on the impressed voltage to the liquid crystal panel of the liquid crystal shutter when conducting the switch operation of the shutter panel. Accordingly, a following problem may be caused. That is, a flicker is sighted when even slight direct-current is applied to the above liquid crystal panel.

BRIEF DESCRIPTION OF THE DRAWINGS

The accompanying drawings, which are incorporated in and constitute a portion of the specification, illustrate embodiments of the invention, and together with the general description given above and the detailed description of the embodiments given below, serve to explain the principles of the invention.

DETAILED DESCRIPTION OF THE INVENTION

Figure 1:
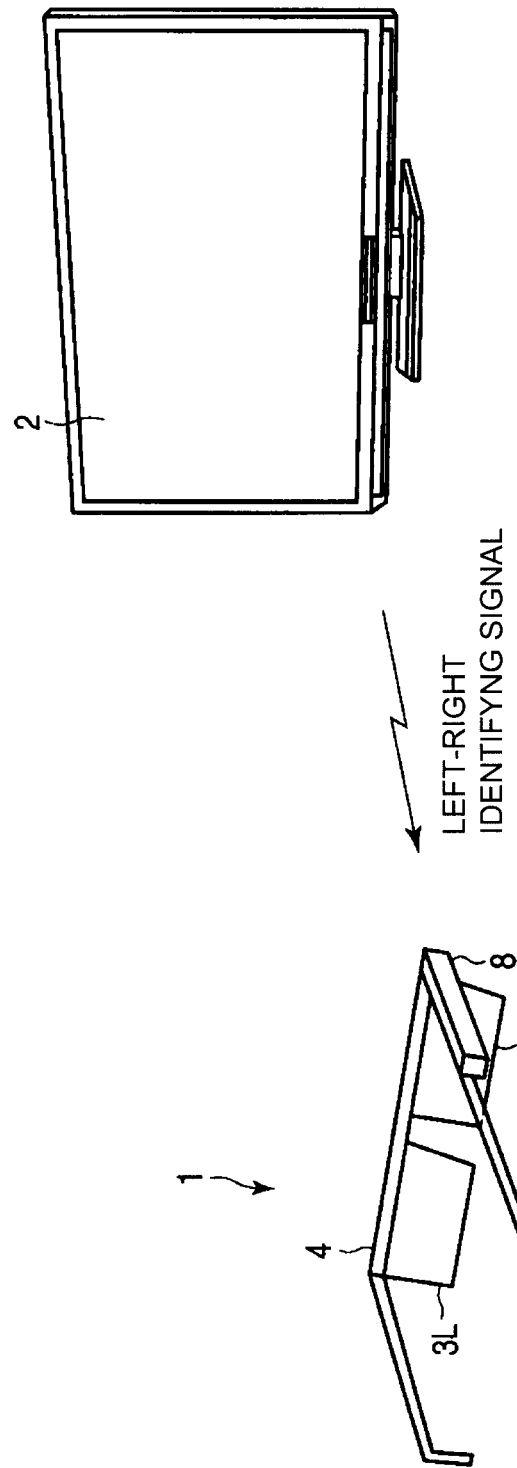
FIG. 1 is a figure schematically showing an image display system according to one embodiment of the present invention.

A liquid crystal shutter, a driving method of the same and an image display system according to an exemplary embodiment of the present invention will now be described with reference to the accompanying drawings wherein the same or like reference numerals designate the same or corresponding portions throughout the several views.

According to one embodiment, a liquid crystal shutter includes: a first liquid crystal panel including a pair of electrode substrates and a liquid crystal layer held between the electrode substrates and covering a left eye sight, the first liquid crystal panel being switched between a transmissive state to pass incident light to left eye and a non-transmissive state to shut the incident light to the left eye; a second liquid crystal panel including a pair of electrode substrates and a liquid crystal layer held between the electrode substrates and covering a right eye sight, the second liquid crystal panel being switched between the transmissive state to pass incident light to the right eye and the non-transmissive state to shut the incident light to the right eye; and a driving circuit to switch the first and second liquid crystal panels between the transmissive state and the non-transmissive state by applying a voltage to the first and second liquid crystal panels by turns while carrying out a polarity inversion driving to invert the polarity of the voltage applied between the pair of the electrode substrates at least once during a period in the transmissive state.

According to other embodiment, a driving method of a liquid crystal shutter includes a first liquid crystal panel including a pair of electrode substrates and a liquid crystal layer held between the electrode substrates and covering a left eye sight, the first liquid crystal panel being switched between a transmissive state to pass incident light to left eye and a non-transmissive state to shut the incident light to the left eye; and a second liquid crystal panel including a pair of electrode substrates and a liquid crystal layer held between the electrode substrates and covering a right eye sight, the second liquid crystal panel being switched between a transmissive state to pass incident light to the right eye and a non-transmissive state to shut incident the light to the right eye. The driving method comprising the steps: switching the first and second liquid crystal panels between the transmissive state and the non-transmissive state by applying a voltage to the first and second liquid crystal panels; and carrying out a polarity inversion driving to invert the polarity of the voltage applied between the pair of the electrode substrates at least once during a period in the transmissive state.

According to other embodiment, an image display system includes: a liquid crystal shutter including; a first liquid crystal panel including a pair of electrode substrates and a liquid crystal layer held between the electrode substrates and covering a left eye sight, the first liquid crystal panel being switched between a transmissive state to pass incident light to left eye and a non-transmissive state to shut the incident light to the left eye, a second liquid crystal panel including a pair of electrode substrates and a liquid crystal layer held between the electrode substrates and covering a right eye sight, the second liquid crystal panel being switched between a transmissive state to pass incident light to the right eye and a non-transmissive state to shut incident light to the right eye, and a driving circuit to switch the first and second panels to the transmissive state or to the non-transmissive state by turns by applying a voltage to the first and second panels, and to invert a voltage applied between the pair of the electrode substrates at least once during a period in the transmissive state, and a display device to display an image for left eye and an image for right eye by turns; wherein a three-dimensional image is displayed by a control of the driving circuit in which the driving circuit switches the first liquid crystal panel to the transmissive state, and the second liquid crystal panel to the non-transmissive state in synchronization to the displayed image for left eye, and switches the first liquid crystal panel to the non-transmissive state, and the second liquid crystal panel to the transmissive state in synchronization to the displayed image for right eye.

According to other embodiment, an image display system includes: a liquid crystal shutter including; a first liquid crystal panel including a pair of electrode substrates and a liquid crystal layer held between the electrode substrates and covering a left eye sight, the first liquid crystal panel being switched between a transmissive state to pass incident light to left eye and a non-transmissive state to shut the incident light to the left eye, a second liquid crystal panel including a pair of electrode substrates and a liquid crystal layer held between the electrode substrates and covering a right eye sight, the second liquid crystal panel being switched between a transmissive state to pass incident light to the right eye and a non-transmissive state to shut incident light to the right eye, and a driving circuit to switch the first and second panels to the transmissive state or the non-transmissive state by turns by applying a voltage to the first and second panels, and to invert a voltage applied between the pair of the electrode substrates at least once during a period in the transmissive state, and a display device to display a first content image and a second content image by turns, wherein one of the first and second content images is displayed by a control of the driving circuit in which the driving circuit switches the first and second liquid crystal panels to the transmissive state in synchronization to one of the first content image display and the second content image display, and switches the first and second liquid crystal panels to the non-transmissive state in synchronization to the other of the first content image display and the second content image display.

First, the structure of the image display system is explained. As shown in FIG. 1, the image display system includes a liquid crystal shutter 1 of an active shutter type, and a liquid crystal display device 2 as a display device.

Figure 2:
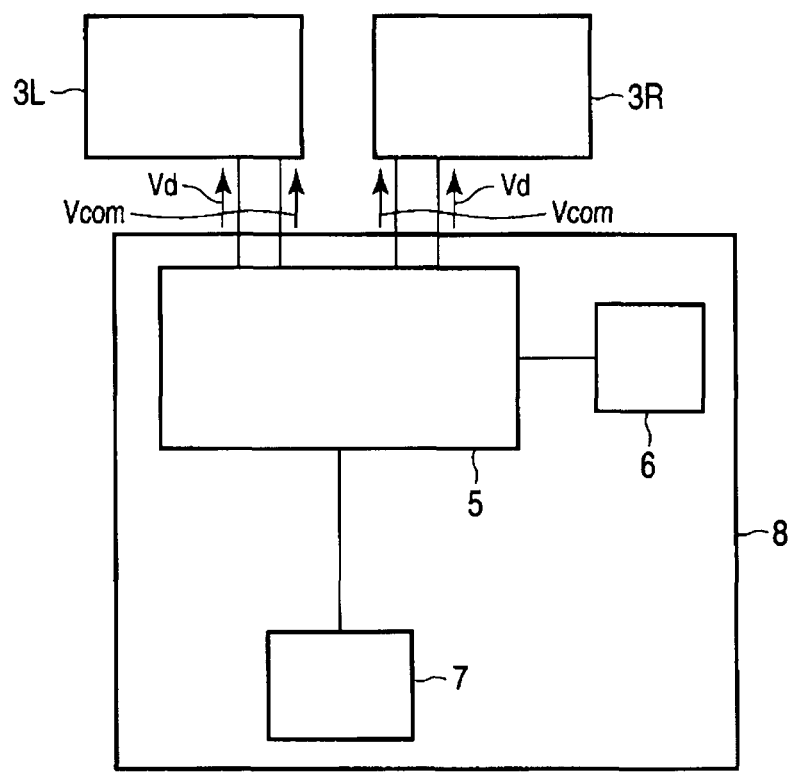
FIG. 2 is a figure schematically showing a liquid crystal shutter shown in FIG. 1.
Figure 3:
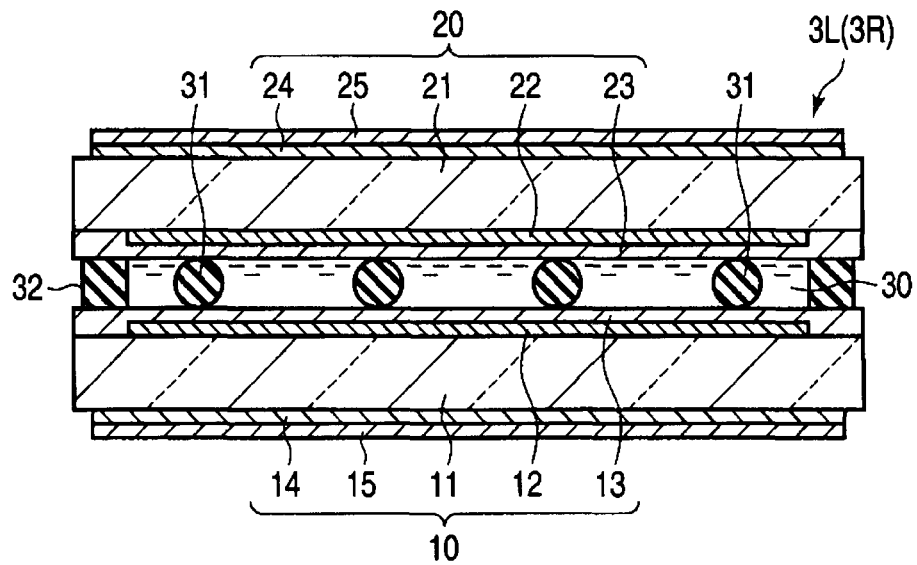
FIG. 3 is a sectional view showing a first liquid crystal panel and a second liquid crystal panel shown in FIG. 1 and FIG. 2.

As shown in FIG. 1 to FIG. 3, the liquid crystal shutter 1 includes a first liquid crystal panel 3L, a second liquid crystal panel 3R, a glasses frame 4, a driving circuit 5, a power supply portion 6, a receiver 7, and a case 8. In this embodiment, the liquid crystal shutter 1 is a glasses wearable type liquid crystal shutter.

The first and second liquid crystal panels 3L and 3R respectively include a liquid crystal layer 30 held between a pair of electrode substrates 10 and 20. The electrode substrate 10 includes a glass substrate 11 as a transparent insulating substrate, a first electrode 12 formed on the glass substrate 11, an alignment film 13 on the glass substrate 11 and the first electrode 12. As the insulating substrate, a plastic substrate or a resin film, etc. are applicable other than the glass substrate. An optical compensation film 14 and a polarizing plate 15 are arranged on the electrode substrate 10. The optical compensation film 14 and the polarizing plate 15 are located in the opposite side of the first electrode 12, and are arranged on an external surface of the glass substrate 11 in order.

The electrode substrate 20 includes a glass substrate 21 as a transparent insulating substrate, a second electrode 22 formed on the glass substrate 21, an alignment film 23 on the glass substrate 21 and the first electrode 22. As the insulating substrate, a plastic substrate or a resin film, etc. are applicable other than the glass substrate. An optical compensation film 24 and a polarizing plate 25 are arranged on the electrode substrate 20. The optical compensation film 24 and the polarizing plate 25 are located in the opposite side of the second electrode 22, and are arranged on an external surface of the glass substrate 21 in order.

The first electrode 12 and the second electrode 22 are formed of transparent conductive materials, for example, ITO (Indium Tin oxide). A rubbing treatment is respectively performed to the alignment films 13 and 23 in the same direction. The polarizing plate 15 and the polarizing plate 25 are made in a cross Nichol arrangement so that they cross at approximately 45° to the alignment direction.

The electrode substrate 10 and the electrode substrate 20 are arranged so as to oppose each other with a predetermined gap by a plurality of spherical spacers 31 as spacers, and are attached by a seal material 32. A pillar-shaped spacer can be formed integrally on one of the substrates in place of the spherical spacers 31. The liquid crystal layer 30 is formed with a nematic liquid crystal filled up in a space surrounded by the electrode substrate 10, the electrode substrate 20, and the seal material 32.

The first liquid crystal panels 3L is formed of a liquid crystal panel of the OCB (optically compensated bend) mode in which π cell is combined with the optical compensation films 14 and 24. Here, the first liquid crystal panel 3L is normally white type in which the panel is in a transmissive state when a voltage is not impressed. The first liquid crystal panels 3L covers eyesight of the left eye, and can switch between the transmissive state (ON) to pass the light entering to the left eye and the non-transmissive state (OFF) to shut the light entering to the left eye.

Figure 4:
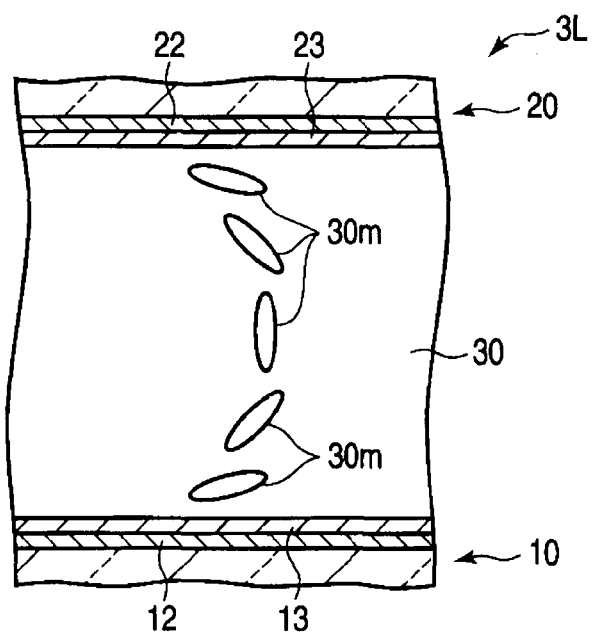
FIG. 4 is a sectional view showing the first and second liquid crystal panels and also is a figure showing an alignment state of liquid crystal molecules when the first and second liquid crystal panels become in a transmissive state.
Figure 5:
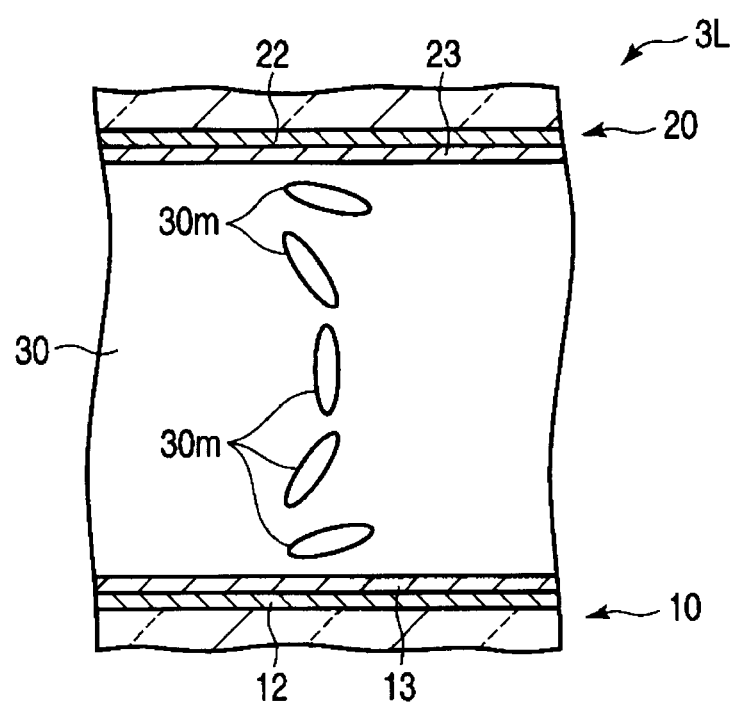
FIG. 5 is a sectional view showing the first and second liquid crystal panels and also is a figure showing an alignment state of the liquid crystal molecules when the first and second liquid crystal panels become in a non-transmissive state.

A driving voltage is impressed to the liquid crystal layer 30 by applying a voltage Vd to the first electrode 12, and applying a voltage Vcom to the second electrode 22. As shown in FIG. 4 and FIG. 5, the liquid crystal molecules 30m are transferred from a splay alignment state to a bend alignment state by impressing a driving voltage of more than a threshold voltage, for example, 20V to the liquid crystal layer 30 (initial transfer). Furthermore, the first liquid crystal panel 3L can be switched between a transmissive state and a non-transmissive state while maintaining the bend alignment state of the liquid crystal molecule 30m by impressing a predetermined driving voltage to the liquid crystal layer 30. The first liquid crystal panel 3L is excellent in high-speed response due to the bend alignment and a flow effect.

As shown in FIG. 1 and FIG. 3, the second liquid crystal panel 3R is formed like the first liquid crystal panel 3L. The second liquid crystal panel 3R includes a pair of electrode substrates 10 and 20 and a liquid crystal layer 30 held between the electrode substrates 10 and 20. The first liquid crystal panels 3L is formed of a liquid crystal panel of the OCB (optically compensated bend) mode and covers the eyesight of right eye, and can be switched to the transmissive state (ON) in which the light entering to the left eye is passed and non-transmissive state (OFF) in which the light entering to the right eye is shut. Here, the second liquid crystal panel 3R is normally white type in which the second liquid crystal panel 3R becomes the transmissive state when a voltage is not applied.

In addition, although not illustrated, the positions of electrical terminals may be arranged at different locations mutually in the first liquid crystal panel 3L and the second liquid crystal panel 3R. Thereby, it becomes possible to distinguish which of the first liquid crystal panel 3L and the second liquid crystal panel 3R is for left eye or for right eye. As shown in FIG. 1, the first liquid crystal panel 3L and the second liquid crystal panel 3R are equipped to the glasses frame 4.

As shown in FIG. 2, the driving circuit 5 is electrically connected to the first liquid crystal panel 3L and the second liquid crystal panel 3R through a flexible printed circuit (FPC) etc. The driving circuit 5 impresses a voltage to the liquid crystal layers 30 of the first liquid crystal panel 3L and the second liquid crystal panel 3R, respectively by supplying a voltage Vd and a voltage Vcom to the first and second liquid crystal panels 3L and 3R. Thereby, the driving circuit 5 switches the liquid crystal layers 30 of the first and second liquid crystal panels 3L and 3R between the transmissive state (ON) and the non-transmissive state (OFF) by turns while the liquid crystal molecules 30m are made in the bend alignment state. In the driving circuit 5, a polarity inversion driving is performed in which the voltage Vd is inverted at least once with respect to the voltage Vcom within one transmissive period.

The power supply portion 6 and the receiver 7 are connected to the driving circuit 5. The power supply portion 6 supplies electric power to the driving circuit 5. The receiver 7 receives data (synchronizing signal) by a cable or wireless communication. The driving circuit 5 impresses the driving voltage to the first liquid crystal panel 3L and the second liquid crystal panel 3R based on the data received with the receiver 7. The case 8 accommodates the driving circuit 5, the power supply portion 6, and the receiver 7 and is equipped to the glasses frame 4. The liquid crystal shutter 1 is formed as mentioned above.

Figure 6:
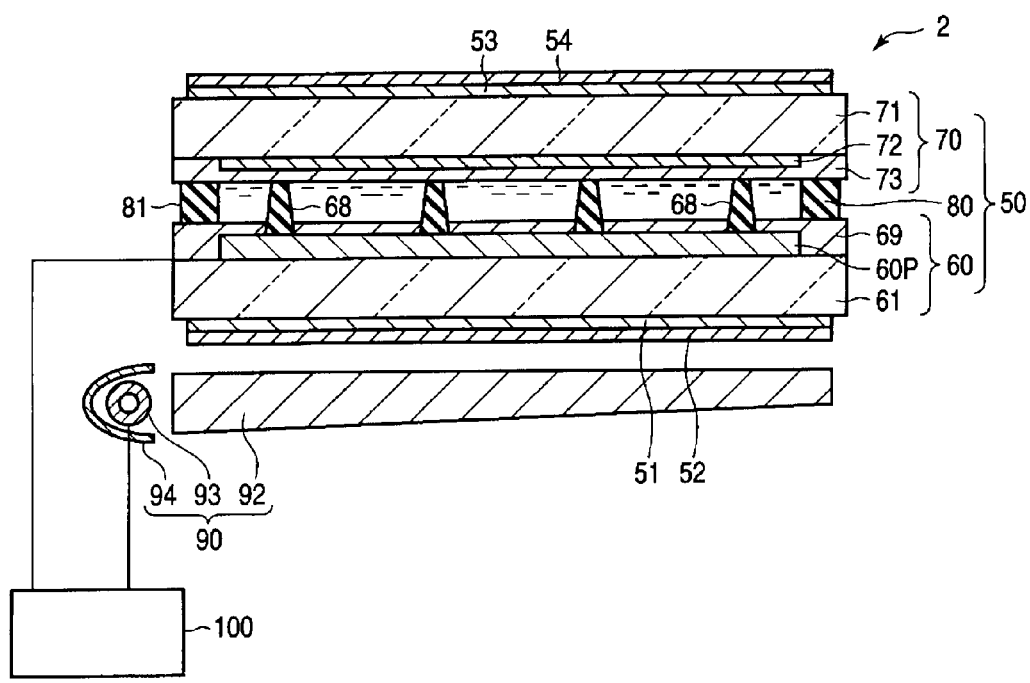
FIG. 6 is a sectional view schematically showing the liquid crystal display device shown in FIG. 1.

As shown in FIG. 1 and FIG. 6, the liquid crystal display device 2 includes a liquid crystal display panel 50, a backlight unit 90, and a control portion 100. The liquid crystal display panel 50 includes an array substrate 60, a counter substrate 70 and a liquid crystal layer 80 held between the array substrate 60 and the counter substrate 70.

Figure 7:
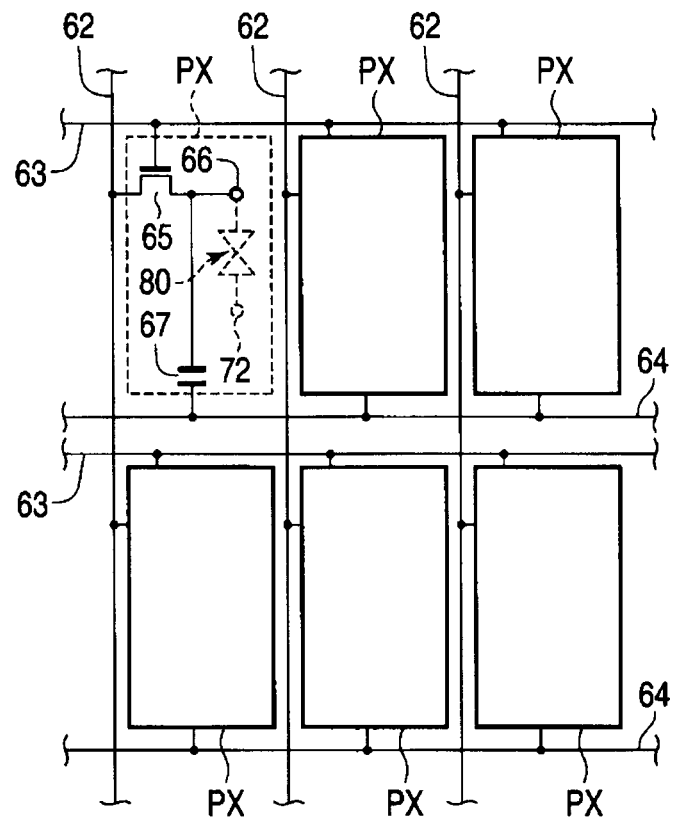
FIG. 7 is a figure showing a portion of an array substrate shown in FIG. 6.

As shown in FIG. 6 and FIG. 7, the array substrate 60 includes a rectangular glass substrate 61 as a transparent insulating substrate. On the glass substrate 61, a plurality of signal lines 62 and a plurality of scanning lines 63 are formed. The signal lines 62 and the scanning lines 63 intersect orthogonally each other. Moreover, a plurality of auxiliary capacitance lines 64 are arranged in parallel with the scanning lines 63 on the glass substrate 61. In this embodiment, a pixel PX is formed in each region surrounded by adjacent two signal lines 62 and adjacent two scanning lines 63. The pixels PX are arranged in the shape of a matrix on the glass substrate 61.

Next, one pixel PX is explained in detail. The pixel PX includes a TFT (thin film transistor) as a switching element 65 formed near intersection of the signal line 62 and the scanning line 63, a pixel electrode 66 connected to the TFT 65, and an auxiliary capacitance element 67 connected to the pixel electrode 66. The auxiliary capacitance line 64 forms one electrode of the auxiliary capacitance element 67.

Although not illustrated, a color filter with three colored layers of red, green and blue is formed on the glass substrate 61. In addition, the above-mentioned pixel electrode 66 is formed on the color filter using transparent electric conduction material, such as ITO. Moreover, for example, a plurality of pillar-shaped spacers 68 are formed as spacers on the color filter. As mentioned above, an array pattern 60P is formed on the glass substrate 61. An alignment film 69 is formed on the glass substrate 61 and the array pattern 60P.

The counter substrate 70 includes a rectangle-like glass substrate 71 as a transparent insulating substrate. On the glass substrate 71, a counter electrode 72 and an alignment film 73 are formed in order. In addition, rubbing treatment is performed to the alignment films 69 and 73 in the same direction. Thus, the counter substrate 70 is formed.

The gap between the array substrate 60 and the counter substrate 70 is held by a plurality of pillar-shaped spacers 68. The array substrate 60 and the counter substrate 70 are attached by a seal material 81 arranged along with a perimeter of a display region. The liquid crystal layer 80 is formed by nematic liquid crystal material which fills up a space surrounded by the array substrate 60, the counter substrate 70, and the seal material 81.

On the external surface of the array substrate 60, an optical compensation film 51 and a polarizing plate 52 are formed in order. Similarly, on the external surface of the counter substrate 70, an optical compensation film 53 and a polarizing plate 54 are formed in order. The polarizing plate 52 and the polarizing plate 54 are made in a cross Nichol arrangement so that they cross at approximately 45° to the alignment direction. Here, the liquid crystal layer 50 is a normally white type in which the liquid crystal layer 50 becomes the transmissive state when a voltage is not applied.

As shown in FIG. 6, the backlight unit 90 is formed in the external surface side of the array substrate 60. The backlight unit 90 includes a light guide 92 with a light guide plate opposing to the polarizing plate 52, a light source 93 arranged at one edge side of the light guide 92 and, for example, formed of a cold cathode fluorescent tube, and a reflector 94.

Figure 8:
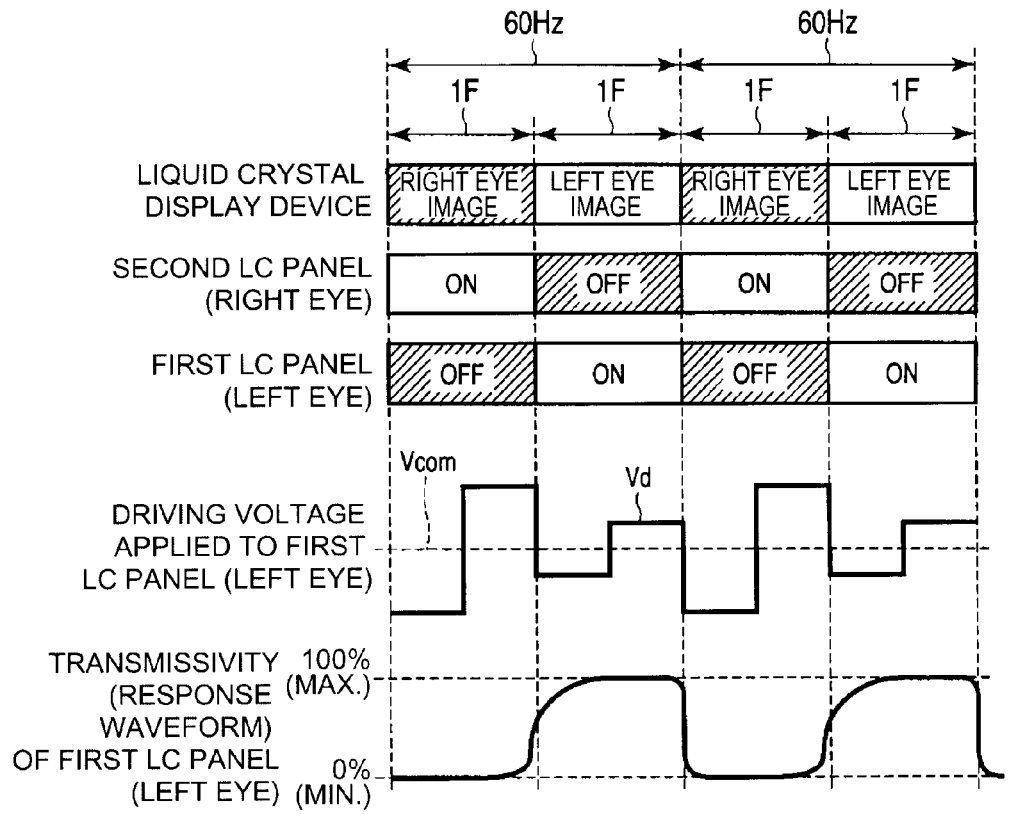
FIG. 8 is a timing chart showing a relation between an ON/OFF timing of the first liquid crystal panel used in the image display system and a driving voltage applied to the first liquid crystal panel, and also showing the image display of the liquid crystal display device, an ON/OFF timing of the second liquid crystal panel, and a transmissivity of the first liquid crystal panel according to a first embodiment.

Next, an operation of the above-mentioned liquid crystal shutter 1 is explained in the case of displaying a three-dimensional image using the liquid crystal display device 2. As shown in FIG. 6 and FIG. 8, the control portion 100 controls the driving of the liquid crystal display panel 50 to display the image for left eye and the image for right eye by turns, for example, in a frame frequency of 120 Hz when displaying the three-dimensional image. Here, one frame (1F) means time during scanning all the pixels PX one by one and till scanning the same pixel PX again.

As apparent from the above explanation, the liquid crystal display device 2 enables the display of the three-dimensional image without the fall of resolution using the frequency of substantially 60 Hz.

As shown in FIG. 1, FIG. 2, and FIG. 8, the driving circuit 5 switches the second liquid crystal panel 3R to the transmissive state (ON) during one arbitrary frame period while the first liquid crystal panel 3L is switched to the non-transmissive state (OFF) in synchronization to the displayed image for right eye by the liquid crystal display device 2. Thereby the transmissivity of the first liquid crystal panel 3L is about 0% during this frame period.

During following one frame period, the driving circuit 5 switches the second liquid crystal panel 3R to the non-transmissive state (OFF) while the first liquid crystal panel 3L is switched to the transmissive state (ON) in synchronization to the displayed image for left eye by the liquid crystal display device 2. If the first liquid crystal panel 3L is switched to the transmissive state (ON), the first liquid crystal panel 3L shows a high-speed response, and the transmissivity of the first liquid crystal panel 3L rises from 0%. Accordingly, the first liquid crystal panel 3L becomes the transmissive state during this frame period.

After that, the first liquid crystal panel 3L and the second liquid crystal panel 3R are switched to the transmissive state by turns in synchronization to the displayed image in the liquid crystal display device 2. When the driving circuit 5 switches the first liquid crystal panel 3L and the second liquid crystal panel 3R to the transmissive state (ON) respectively, the first and second liquid crystal panels 3L and 3R are switched in 1/60 seconds after being switched to the transmissive state (ON) last time. Thereby, the user who wears the liquid crystal shutter 1 can see the image for left eye and the image for right eye by turns by right and left eyes, and the three-dimensional image is displayed to the user.

Next, the liquid crystal shutter 1 and the driving method of the shutter 1 in the above display system according to the first to fifth embodiments are explained. The liquid crystal shutter 1 and the driving method of the shutter 1 in the above display system are examples in which the generation of the flicker can be suppressed.

[First Embodiment]

First, the liquid crystal shutter 1 and the driving method of the shutter 1 according to the first embodiment are explained. As shown in FIG. 2, FIG. 3, and FIG. 8, during one-frame period when the first liquid crystal panel 3L becomes in the non-transmissive state (OFF), the driving circuit 5 supplies a voltage Vd of −10V to the first electrode 12 of the first liquid crystal panel 3L in the first half period, and +10V in the second half of the one frame-period, and supplies a voltage Vcom of 0V to the second electrode 22. In addition, the second electrode 22 is set, for example, to a ground potential.

As mentioned above, during the one-frame period when the first liquid crystal panel 3L is in the non-transmissive state (OFF), the driving circuit 5 carries out a polarity inversion driving in which the polarity of the voltage Vd supplied to the first liquid crystal panel 3L (the first electrode 12) is inverted once.

Following to the above one-frame period, the driving circuit 5 supplies the voltage Vd of −4V to the first electrode 12 of the first liquid crystal panel 3L in the first half of the one-frame period and +4V in the second half of the one-frame period while the first liquid crystal panel 3L becomes in the transmissive state (ON).

As mentioned above, the driving circuit 5 carries out the polarity-inversion driving which inverts once the polarity of the voltage Vd supplied to the first liquid crystal panel 3L during the one-frame period while the first liquid crystal panel 3L becomes in the transmissive state (ON). The driving voltage which switches the first liquid crystal panel 3L to a transmissive state (ON) is smaller than the driving voltage which switches the first liquid crystal panel 3L to the non-transmissive state (OFF).

The first liquid crystal panel 3L is similarly switched between the non-transmissive state (OFF) and the transmissive state (ON) by turns for every one-frame period after that. The second liquid crystal panel 3R is also driven as well as the first liquid crystal panel 3L. The second liquid crystal panel 3R is also switched to the non-transmissive state (OFF) or the transmissive state (ON) by turns for every one-frame period while carrying out the polarity inversion driving.

[Second Embodiment]

Next, the liquid crystal shutter 1 and the driving method of the shutter 1 in the above image display system according to the second embodiment are explained. The liquid crystal shutter 1 and the driving method of the liquid crystal shutter 1 according to this embodiment is the same as those of the liquid crystal shutter 1 according to the first embodiment, excepting a point that the polarity inversion driving is not carried out to the first liquid crystal panel 3L and the second liquid 3R crystal panel during the non-transmissive (OFF) period.

Figure 9:
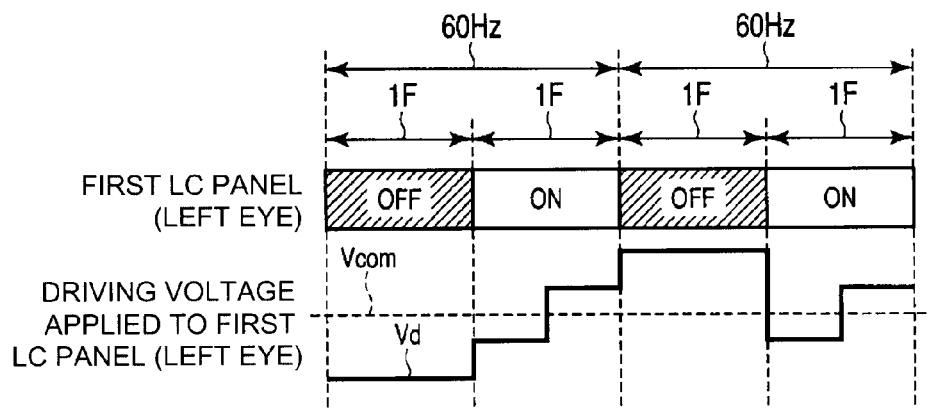
FIG. 9 is a timing chart showing a relation between the ON/OFF timing of the first liquid crystal panel used in the image display system and the driving voltage applied to the first liquid crystal panel according to a second embodiment.

In detail, as shown in FIG. 2, FIG. 3, and FIG. 9, the driving circuit 5 supplies the voltage Vd of −10V to the first electrode 12 of the first liquid crystal panel 3L during the one-frame period while the first liquid crystal panel 3L becomes the non-transmissive state (OFF), and supplies the voltage Vcom of 0V to the second electrode 22. The second electrode 22 is always set to a ground potential.

As mentioned above, during the one-frame period while the first liquid crystal panel 3L becomes a non-transmissive state (OFF), the driving circuit 5 supplies a voltage Vd to the first liquid crystal panel 3L (first electrode 12) without a polarity inversion driving.

Subsequently, the driving circuit 5 supplies a voltage Vd of −4V to the first electrode 12 of the first liquid crystal panel in the first half of the one-frame period and +4V in the second half period while the first liquid crystal panel 3L becomes in the transmissive state (ON)

As mentioned above, the driving circuit 5 carries out the polarity inversion driving which inverts once the polarity of the voltage Vd applied to the first liquid crystal panel 3L (the first electrode 12) while the first liquid crystal panel 3L becomes the transmissive state (ON)

Following to above one-frame period, the driving circuit 5 supplies a voltage Vd of +10V to the first electrode 12 of the first liquid crystal panel 3L during one-frame period when the first liquid crystal panel 3L becomes in the transmissive state (OFF). The driving voltage which switches the first liquid crystal panel 3L to the transmissive state (ON) is smaller than that which switches the first liquid crystal panel 3L to the non-transmissive state (OFF)

The first liquid crystal panel 3L is similarly switched to the transmissive state (ON) and the non-transmissive state (OFF) by turns for every one-frame period after that. The second liquid crystal panel 3R is driven as well as the first liquid crystal panel 3L. The non-transmissive state (OFF) and the transmissive state (ON) are switched by turns for every one-frame period while carrying out the polarity-inversion driving every period of the transmissive state (ON).

[Third Embodiment]

Next, the liquid crystal shutter 1 and the driving method of the shutter 1 in the above image display system according to the third embodiment are explained. The liquid crystal shutter 1 and driving method of the liquid crystal shutter 1 according to this embodiment are the same as those of the liquid crystal shutter 1 according to the first embodiment, excepting a point that the polarity inversion driving to invert the voltage Vd supplied to the first and second liquid crystal panels 3L and 3R is carried out three times during both the transmissive (ON) period and non-transmissive (OFF) period.

Figure 10:
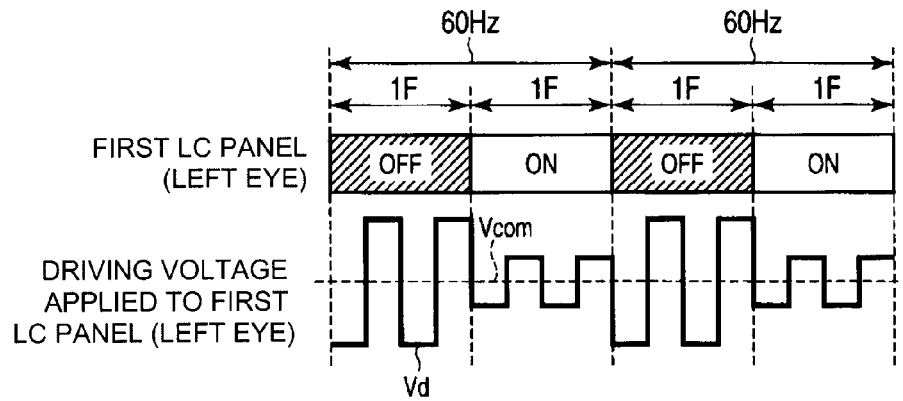
FIG. 10 is a timing chart showing a relation between the ON/OFF timing of the first liquid crystal panel used in the image display system and the driving voltage applied to the first liquid crystal panel according to a third embodiment.

In detail, as shown in FIG. 2, FIG. 3, and FIG. 10, the driving circuit 5 supplies the voltage Vd of −10V and +10V to the first electrode 12 of the first liquid crystal panel 3L by turns during the one-frame period while the first liquid crystal panel 3L becomes the non-transmissive state (OFF), and supplies the voltage Vcom of 0V to the second electrode 22. In addition, the second electrode 22 is always set to a ground potential.

As mentioned above, during the one-frame period while the first liquid crystal panel 3L becomes the non-transmissive state (OFF), the driving circuit 5 carries out the polarity inversion three times to invert the polarity of the voltage Vd supplied to the first liquid crystal panel 3L (the first electrode 12)

Following to the above-mentioned one-frame period, the driving circuit 5 supplies the voltage Vd of −4V and +4V to the first electrode 12 of the first liquid crystal panel 3L by turns during one-frame period while the first liquid crystal panel 3L becomes in the transmissive state (ON).

As mentioned above, the driving circuit 5 carries out the polarity-inversion driving three times to invert the polarity of the voltage Vd supplied to the first liquid crystal panel 3L while the first liquid crystal panel 3L becomes in the transmissive state (ON). The driving voltage which switches the first liquid crystal panel 3L to the transmissive state (ON) is smaller than that which switches the first liquid crystal panel 3L to the non-transmissive state (OFF).

The first liquid crystal panel 3L is similarly switched to the non-transmissive state (OFF) and the transmissive state (ON) by turns for every one-frame period after that. The second liquid crystal panel 3R is driven as well as the first liquid crystal panel 3L. The transmissive state (ON) and the non-transmissive state (OFF) are switched by turns for every one-frame period while carrying out the polarity-inversion driving.

[Fourth Embodiment]

Next, the liquid crystal shutter 1 and the driving method of the shutter 1 in the above image display system according to the fourth embodiment are explained. The liquid crystal shutter 1 and driving method of the liquid crystal shutter 1 according to this embodiment are the same as those of the liquid crystal shutter 1 according to the first embodiment, excepting a point that the amplitude of the voltage Vd is changed to smaller one, and the voltage Vcom is changed to a pulse voltage from the constant voltage.

Figure 11:
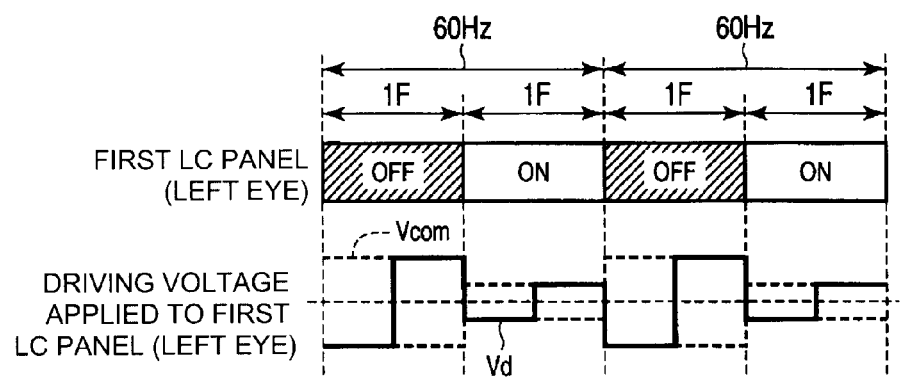
FIG. 11 is a timing chart showing a relation between the ON/OFF timing of the first liquid crystal panel used in the image display system and the driving voltage applied to the first liquid crystal panel according to a fourth embodiment.

In detail, as shown in FIG. 2, FIG. 3, and FIG. 11, the driving circuit 5 supplies a voltage Vd of −5V in the first half period and +5V in the second half period to the first electrode 12 of the first liquid crystal panel 3L during the one-frame period while the first liquid crystal panel 3L becomes the non-transmissive state (OFF), and supplies a voltage Vcom of +5V in the first half period and −5V in the second half period to the second electrode 22.

As mentioned above, during the one-frame period while the first liquid crystal panel 3L becomes the non-transmissive state (OFF), the driving circuit 5 carries out the polarity-inversion driving once to invert the polarity of the voltage Vd and the voltage Vcom applied to the first liquid crystal panel 3L, respectively.

Subsequently, the driving circuit 5 supplies a voltage Vd of −2V in the first half of the one-frame period and +2V in the second half period to the first electrode 12 of the first liquid crystal panel 3L. The driving circuit 5 also supplies a voltage Vcom of +2V in the first half of the one-frame period and −2V in the second half period to the second electrode 22 while the first liquid crystal panel 3L becomes in the transmissive state (ON) following the above-mentioned one-frame period.

As mentioned above, the driving circuit 5 carries out the polarity-inversion driving once to invert respectively the polarity of the voltage Vd and Vcom supplied to the first liquid crystal panel 3L while the first liquid crystal panel 3L becomes the transmissive state (ON). The driving voltage which switches the first liquid crystal panel 3L to the transmissive state (ON) is smaller than that which switches the first liquid crystal panel 3L to the non-transmissive state (OFF).

The first liquid crystal panel 3L is similarly switched to the non-transmissive state (OFF) and the transmissive state (ON) by turns for every one-frame period after that. The second liquid crystal panel 3R is driven as well as the first liquid crystal panel 3L. The transmissive state (ON) and the non-transmissive state (OFF) are switched by turns for every one-frame period while carrying out the polarity-inversion driving.

[Fifth Embodiment]

Next, the liquid crystal shutter 1 and the driving method of the shutter 1 in the above display system according to the fifth embodiment are explained The liquid crystal shutter 1 and driving method of the liquid crystal shutter 1 according to this embodiment are the same as those of the liquid crystal shutter 1 according to the second embodiment, excepting a point that the amplitude of the voltage Vd is changed to smaller one, and the voltage Vcom is changed to a pulse voltage from the constant voltage.

Figure 12:
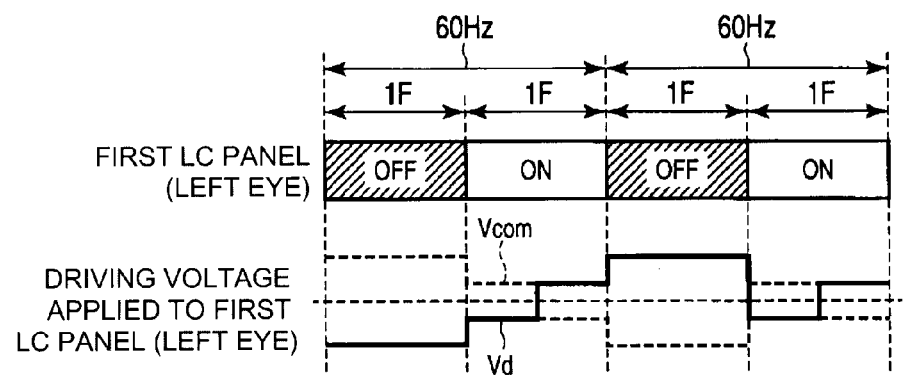
FIG. 12 is a timing chart showing a relation between the ON/OFF timing of the first liquid crystal panel used in the image display system and the driving voltage applied to the first liquid crystal panel according to a fifth embodiment.

In detail, as shown in FIG. 2, FIG. 3, and FIG. 12, the driving circuit 5 supplies a voltage Vd of −5V to the first electrode 12 of the first liquid crystal panel 3L and a voltage Vcom of +5V to the second electrode 22 during one-frame period while the first liquid crystal panel 3L becomes the transmissive state (ON).

As mentioned above, during the one-frame period while the first liquid crystal panel 3L becomes the non-transmissive state (OFF), the driving circuit 5 supplies the voltage Vd and voltage Vcom to the first liquid crystal panel 3L without carrying out the polarity-inversion driving.

Following to the above one-frame period, the driving circuit 5 supplies the voltage Vd of −2V in the first half period and +2V in the second half period to the first electrode 12 of the first liquid crystal panel 3L, and the voltage Vcom of +2V in the first half period and −2V in the second half period to the second electrode during one-frame period while the first liquid crystal panel 3L becomes in the transmissive state (ON).

As mentioned above, the driving circuit 5 carries out the polarity-inversion driving once to invert the polarity of the voltage Vd and Vcom supplied to the first liquid crystal panel 3L during the one-frame period while the first liquid crystal panel 3L becomes in the transmissive state (ON). The driving voltage which switches the first liquid crystal panel 3L to the transmissive state (ON) is smaller than that which switches the first liquid crystal panel 3L to the non-transmissive state (OFF).

Similarly, the first liquid crystal panel 3L is switched to the non-transmissive state (OFF) or the transmissive state (ON) by turns for every one-frame period after that. The second liquid crystal panel 3R is driven as well as the first liquid crystal panel 3L. The transmissive state (ON) and the non-transmissive state (OFF) are switched by turns for every one-frame period with a polarity-inversion driving while the second liquid crystal panel 3R is in the transmissive state (ON).

Next, a relation between the liquid crystal shutter 1 and the display device 2 in the display system of the above embodiment is explained further. Hereinafter, an explanation is made using the liquid crystal shutter 1 according to the first embodiment. Although the liquid crystal display device 2 can display an image (moving image) and a still image, here, the case where the liquid crystal display device 2 displays the image (moving image) is explained.

As shown in FIG. 1, the liquid crystal display device 2 displays images and simultaneously outputs an identifying signal that shows which image for left eye and for right eye is displayed now. As shown in FIG. 1 and FIG. 2, the receiver 7 of the liquid crystal shutter 1 receives the outputted identifying signal from the liquid crystal display device 2, and transmits the identifying signal to the driving circuit 5. Thereby, the driving circuit 5 can conduct an opening-and-closing operation of the first liquid crystal panel 3L and the second liquid crystal panel 3R in synchronization to the displayed image for left eye and right eye by the liquid crystal display device 2.

Figure 13:
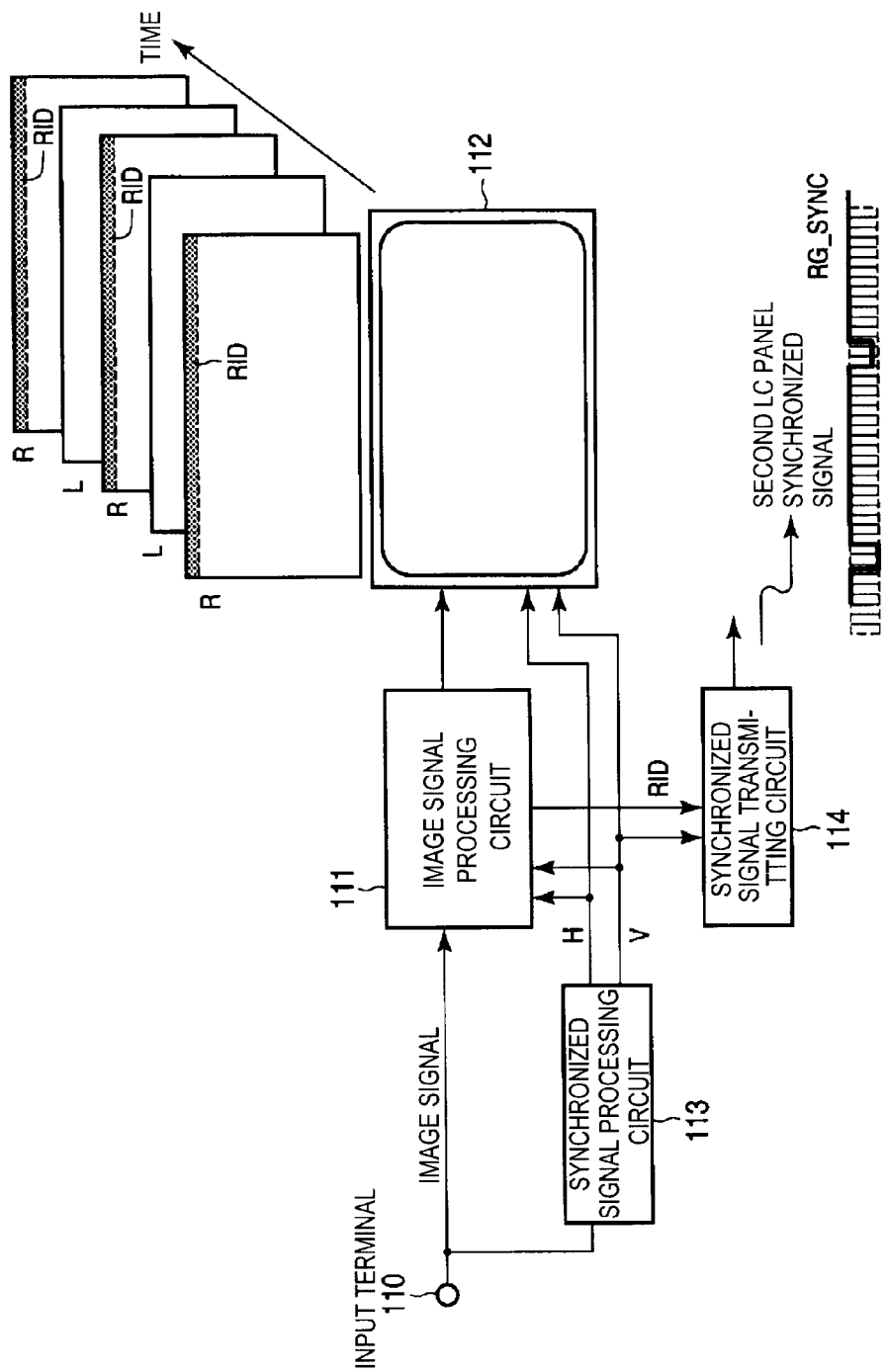
FIG. 13 is figure schematically showing a portion of the structure of the liquid crystal display device.

FIG. 13 shows the structure of the liquid crystal display device 2. As shown in FIG. 13, the image signals for left eye and for right eye are inputted to an input terminal 110 of the liquid crystal display device 2. The signals may be any of signals acquired from a broadcast signal and a signal reproduced from a recording medium. Although the image signal for the two-dimensional image display is also inputted to the input terminal 110, the case where the image signal for the three-dimensional display (the image signal for left eye and the image signal for right eye) is inputted is explained hereinafter.

The image signal inputted to the input terminal 110 is transmitted to an image signal processing circuit 111 and a synchronized signal processing circuit 113. The synchronized signal processing circuit 113 separates and outputs a horizontal synchronized signal H and a vertical synchronized signal V from the image signal.

The horizontal synchronized signal H and the vertical synchronized signal V are inputted to the image signal processing circuit 111 and are used as a timing pulse for signal processing. Moreover, the horizontal synchronized signal H and the vertical synchronized signal V are inputted to the display portion 112 of the liquid crystal display device 2 and are used as a timing pulse for a horizontal scan and a vertical scan. The liquid crystal display device 2 displays an image for left eye based on a signal L and an image for right eye based on a signal R by turns outputted from the image signal processing circuit 111.

Here, the identifying signal RID is inserted in a portion of image signal R for right eye in the horizontal period which does not usually appear in the display region, for example, immediately after a vertical blanking period. The R identifying signal RID is extracted in the image signal processing circuit 111. The R identifying signal RID is inputted to the synchronized signal transmitting circuit 114. Moreover, above-mentioned vertical synchronized signal V is also inputted to the synchronized signal transmitting circuit 114.

The synchronized signal transmitting circuit 114 generates a second liquid crystal panel synchronizing signal RG_SYNC using the vertical synchronized signal V and the R identifying signal RID, and transmits the signal RG_SYNC to the receiver 7. In this embodiment, although the second liquid crystal panel synchronizing signal RG_SYNC is transmitted, a first liquid crystal panel synchronized signal, or both of the first and second synchronizing signals may be transmitted.

Figure 14:
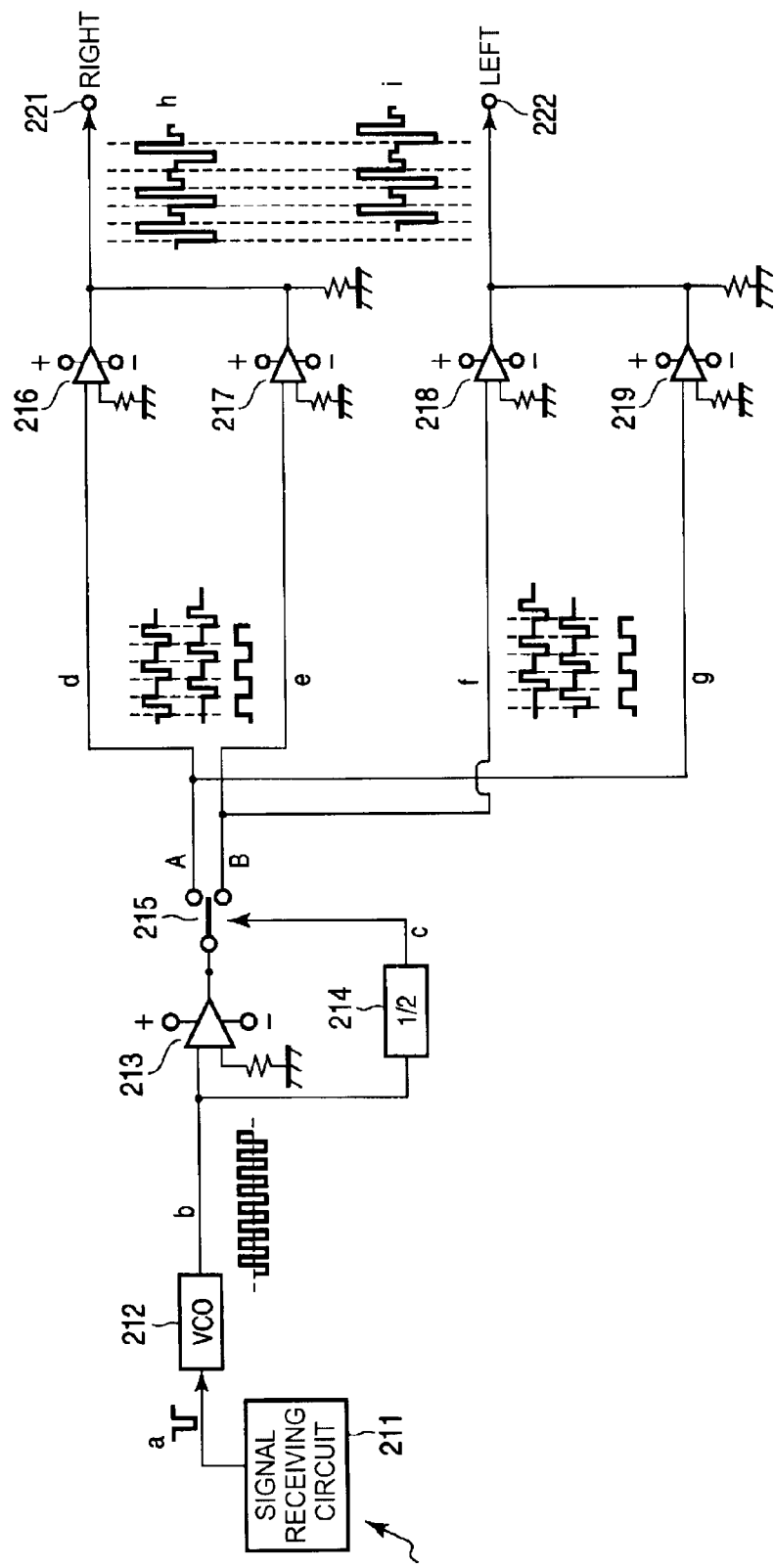
FIG. 14 is a figure schematically showing a receiver used in the liquid crystal shutter.
Figure 15:
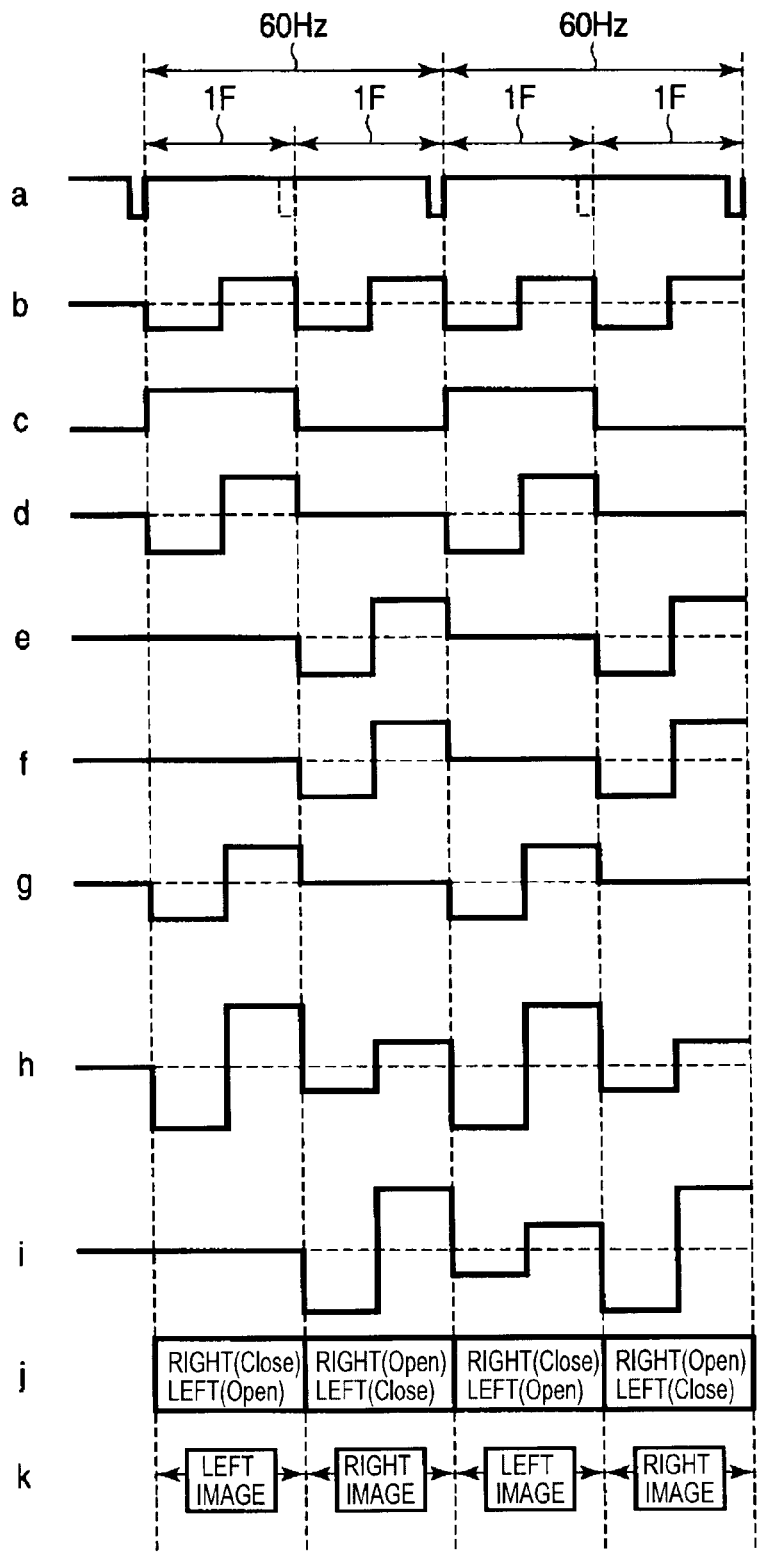
FIG. 15 is a timing chart showing respective signal waveforms of each portion of the receiver, that is, (1) a phase synchronizing signal: a, (2) a pulse signal: b, (3) a switch control pulse signal: c, (4) a signal: d, (5) a signal: e, (6) a signal: f, (7) a signal: g, (8) a second liquid crystal panel driving signal: h, (9) a first liquid crystal panel driving signal: i, (10) an opening-closing sequence of the first and second liquid crystal panels: j, and (11) a sequence of the image displayed on the liquid crystal display device: k.

FIG. 14 shows the receiver 7 of the liquid crystal shutter 1. Moreover, FIG. 15 shows signal waveforms at each portion of the receiver 7. As shown in FIG. 14 and FIG. 15, a signal receiving circuit 211 demodulates the second liquid crystal panel synchronizing signal RG_SYNC. The second liquid crystal panel synchronizing signal RG_SYNC is inputted to a voltage controlled oscillator 212 as a phase synchronizing signal. The voltage controlled oscillator 212 contains a phase lock loop and a divider circuit, and generates and outputs a pulse signal synchronized with the second liquid crystal panel synchronizing signal RG_SYNC. The pulse signal b is changed from a low level to a high level for every one-frame period. The pulse signal b is inputted to an amplifier 213 and is transformed to a positive and negative symmetrical waveform with respect to the reference voltage and is inputted to a switch 215. Moreover, the pulse signal b is inputted to a ½ divider 214, and the ½ divider 214 outputs a switch control pulse signal c.

When the switch control pulse c is positive, the switch 215 is connected to a terminal A, and when the switch control pulse c is negative, the switch 215 is connected to a terminal B. The terminal A is connected to the amplifiers 216 and 219, and the terminal B is connected to the amplifiers 217 and 218. The amplifier 216 amplifies the signal d from the terminal A, and the amplifier 217 amplifies the signal e from the terminal B. The signals amplified with the amplifiers 216 and 217 are synthesized and are outputted to the output terminal 221 as a second liquid crystal panel driving signal h (voltage Vd). Here, the amplification rate of the amplifier 216 is set smaller than that of the amplifier 217.

On the other hand, the amplifier 219 amplifies the signal g (=d) from the terminal A, and the amplifier 218 amplifies the signal f (=e) from the terminal B. The signals amplified with the amplifier 219 and the amplifier 218 are synthesized and are outputted to an output terminal 222 as a first liquid crystal panel driving signal i (voltage Vd). Here, the amplification rate of the amplifier 218 is set smaller than that of the amplifier 219.

The second liquid crystal panel 3R and the first liquid crystal panel 3L are respectively driven by the above-mentioned second liquid crystal panel driving signal h and the first liquid crystal panel driving signal i. In addition, in FIG. 15, j shows an opening-and-closing sequence of the first liquid crystal panel 3L (for left eye) and the second liquid crystal panel 3R (for right eye). Moreover, k shows a sequence of the images for left eye and for right eye displayed on the liquid crystal display device 2.

According to the image display system with the liquid crystal shutter 1 constituted as above and the driving method of the liquid crystal shutter 1, the image display system includes the glasses wearing type liquid crystal shutter 1 and the liquid crystal display device 2 which displays the image for left eye (video image) and the image for right eye (video image) by turns. The liquid crystal shutter 1 includes the first liquid crystal panel 3L in the OCB mode for left eye, the second liquid crystal panel 3R in the OCB mode for right eye, and the driving circuit 5.

The driving circuit 5 impresses voltages to the first liquid crystal panel 3L and the second liquid crystal panel 3R respectively, and switches the first liquid crystal panel 3L and the second liquid crystal panel 3R to the transmissive state (ON) or the non-transmissive state (OFF) by turns, respectively. In the first liquid crystal panel 3L and the second liquid crystal panel 3R, when the first liquid crystal panel 3L and the second liquid crystal panel 3R are respectively in the non-transmissive state (OFF), the bend alignment state of the liquid crystal molecule 30*m* can be maintained by inserting a black display image during a display period (black insertion). That is, the reverse transfer from the bend alignment state to the splay alignment state of the liquid crystal molecule 30*m* can be controlled, and a clear image display can be obtained.

The liquid crystal display device 2 displays the image for left eye (video image) and the image for right eye (video image) in the frequency of 120 Hz by turns, and the first liquid crystal panel 3L and the second liquid crystal panel 3R are switched to the transmissive state (ON) or the non-transmissive state (OFF) by turns in the frequency of 120 Hz. Accordingly, a clear three-dimensional image equivalent to the case where the image is displayed in the frequency of substantially 60 Hz is achieved for the user who wears the liquid crystal shutter 1.

The driving circuit 5 carries out the polarity inversion of the polarity of the voltage Vd in the first to third embodiments, and the polarity inversion of the polarity of the voltage Vd and Vcom in the fourth and fifth embodiments at least once within the period of the transmissive state (ON). That is, in the first liquid crystal panel 3L and the second liquid crystal panel 3R, the polarity of the voltage impressed between respective first electrode 12 and the second electrode 22, is inverted at least once in a two-frame period (for 1/60 seconds). Accordingly, the possible generation of a flicker in the first liquid crystal panel 3L and the second liquid crystal panel 3R can be suppressed, and the same effect as the case where a higher frame frequency is used can be acquired. Thereby, it becomes possible to suppress the generation of the flicker regardless of each voltage-transmissivity characteristics of the first liquid crystal panel 3L and the second liquid crystal panel 3R.

Since, in the second and fifth embodiments, the polarity inversion is performed during only the period in the transmissive state (ON), the rising of the electric power consumption is suppressed. In the first, third and fourth embodiments, the polarity inversion driving is performed for every period not only in the period of the transmissive state (ON) but the non-transmitting state (OFF). Thereby, the possible flicker during the black display can be suppressed.

According to the above embodiments, the liquid crystal shutter 1 capable suppressing the flicker, a driving method of the liquid crystal shutter 1 and the display system equipped with the liquid crystal shutter 1 can be obtained.

According to the embodiments, the driving circuit 5 shall carry out at least once the polarity inversion driving to invert the polarity of the voltage for every period of the transmissive state (ON), and the effect mentioned above can be acquired by inverting the polarity of the voltage not only once and three times but twice and more than four times.

The value of the above-mentioned voltage Vd and voltage Vcom are not limited to the above-mentioned examples, and can be changed variously. That is, the value of the voltage Vd and voltage Vcom should be adjusted so as to fit to the design of the first liquid crystal panel 3L and the second liquid crystal panel 3R.

In the embodiments, the liquid crystal display device 2 displays the image for left eye (video image) and the image for right eye (video image) by turns in the frequency of 120 Hz, and the first liquid crystal panel 3L and the second liquid crystal panel 3R are switched to the transmissive state (ON) or the non-transmissive state (OFF) by turns in the frequency of 120 Hz. Such frequency is not limited to 120 Hz and can be modified variously, for example, by driving in a higher frequency of, for example, 240 Hz.

Although the first liquid crystal panel 3L and the second liquid crystal panel 3R are a normally white type, they may be a normally black type in which the light is shut out in the state where a voltage is not impressed by adjusting the design.

Although the driving circuit 5 is accommodated in the case 8, the accommodation method is not limited to this, and can change variously. For example, a portion or whole of the driving circuit 5 may be provided in the first liquid crystal panel 3L and the second liquid crystal panel 3R.

The liquid crystal shutter 1 is not limited to the glasses wearing type liquid crystal shutter, and can be changed variously. That is, the liquid crystal shutter may be equipped to components other than the glasses frame 4.

The use of the liquid crystal shutter 1 may not be limited to a three-dimensional image display, and can change variously. For example, the liquid crystal shutter 1 may be used for content selection. In this case, the image of the first content and the image of the second content are displayed on the liquid crystal display device 2 by turns, while only the selected one of contents can be displayed to the user who wears the liquid crystal shutter 1.

In detail, the driving circuit 5 takes a synchronization to either the image display of the first content or the image display of the second content by the liquid crystal display device 2, and switches the first liquid crystal panel 3L and the second liquid crystal panel 3R to the transmissive state (ON). On the other hand, synchronization is taken on the other of the image displays of the first content and the second content, and the first liquid crystal panel 3L and the second liquid crystal panel 3R are changed to the non-transmissive state (OFF). Thereby, either one of the images of the first content and the second content can be displayed on the user who wears the liquid crystal shutter 1.

The above-mentioned display device may not be limited to the liquid crystal display device 2, and can change variously. That is, the display devices may be PDP (Plasma Display Panel) display device or a CRT (cathode-ray tube) display device.

While certain embodiments have been described, these embodiments have been presented by way of example only, and are not intended to limit the scope of the inventions. In practice, the structural and method elements can be modified without de portioning from the spirit of the invention. Various embodiments can be made by properly combining the structural and method elements disclosed in the embodiments. For example, some structural and method elements may be omitted from all the structural and method elements disclosed in the embodiments. Furthermore, the structural and method elements in different embodiments may properly be combined. The accompanying claims and their equivalents are intended to cover such embodiments or modifications as would fall with the scope and spirit of the inventions.

What is claimed is:

1. A liquid crystal shutter, comprising:
   a first liquid crystal panel including a pair of electrode substrates and a liquid crystal layer held between the electrode substrates and covering a left eye sight, the first liquid crystal panel being switched between a transmissive state to pass incident light to left eye and a non-transmissive state to shut the incident light to the left eye;
   a second liquid crystal panel including a pair of electrode substrates and a liquid crystal layer held between the electrode substrates and covering a right eye sight, the second liquid crystal panel being switched between the transmissive state to pass incident light to the right eye and the non-transmissive state to shut the incident light to the right eye; and
   a driving circuit to switch the first and second liquid crystal panels between the transmissive state and the non-transmissive state by applying a voltage to the first and second liquid crystal panels by turns, wherein the driving circuit carries out a polarity inversion to invert the polarity of the voltage applied between the pair of the electrode substrates at least once during a period in the transmissive state.

2. The liquid crystal shutter according to claim 1, wherein the driving circuit inverts the polarity of the voltage applied between the pair of the electrode substrates at least once during a period in the non-transmissive state.

3. The liquid crystal shutter according to claim 1, wherein the liquid crystal layer is formed of the OCB (optically compensated bend) mode liquid crystal layer.

4. The liquid crystal shutter according to claim 3, wherein a driving voltage which switches the first liquid crystal panel to the transmissive state (ON) is smaller than that which switches the first liquid crystal panel to the non-transmissive state (OFF).

5. The liquid crystal shutter according to claim 1, wherein the driving circuit switches the respective first and second liquid crystal panels to the transmissive state or the non-transmissive state every $1/120$ seconds.

6. The liquid crystal shutter according to claim 1, wherein the driving circuit switches the second liquid crystal panel to the non-transmissive state while the first liquid crystal panel is switched to the transmissive state, and switches the second liquid crystal panel to the transmissive state while the first liquid crystal panel is switched to the non-transmissive state.

7. The liquid crystal shutter according to claim 1, wherein the driving circuit switches the first and second liquid crystal panels to the transmissive state and non-transmissive state by turns in synchronous with each other.

8. The liquid crystal shutter according to claim 1, further comprising a glasses frame, wherein the first and second liquid crystal panels are equipped to the glasses frame.

9. A driving method of a liquid crystal shutter including;
   a first liquid crystal panel including a pair of electrode substrates and a liquid crystal layer held between the electrode substrates and covering a left eye sight, the first liquid crystal panel being switched between a transmissive state to pass incident light to left eye and a non-transmissive state to shut the incident light to the left eye; and
   a second liquid crystal panel including a pair of electrode substrates and a liquid crystal layer held between the electrode substrates and covering a right eye sight, the second liquid crystal panel being switched between a transmissive state to pass incident light to the right eye and a non-transmissive state to shut incident the light to the right eye; the driving method comprising the steps:
   switching the first and second liquid crystal panels between the transmissive state and the non-transmissive state by applying a voltage to the first and second liquid crystal panels, wherein the first liquid crystal panel is in the transmissive state when the second liquid crystal panel is in the non-transmissive state, and the first liquid crystal panel is in the non-transmissive state when the second liquid crystal panel is in the transmissive state; and
   carrying out a polarity inversion driving to invert the polarity of the voltage applied between the pair of the electrode substrates at least once during a period in the transmissive state for the respective first and second liquid crystal panels.

10. The driving method of a liquid crystal shutter to claim 9, wherein the polarity of the voltage applied between the pair of the electrode substrates is inverted at least once during a period in the non-transmissive state for the respective first and second liquid crystal panels.

11. The driving method of a liquid crystal shutter according to claim 9, wherein the liquid crystal layer is formed of the OCB (optically compensated bend) mode liquid crystal layer.

12. The driving method of a liquid crystal shutter according to claim 11, wherein a driving voltage which switches the first liquid crystal panel to the transmissive state (ON) is smaller than that which switches the first liquid crystal panel to the non-transmissive state (OFF).

13. The driving method of the liquid crystal shutter according to claim 9, wherein the respective first and second liquid crystal panels are switched to the transmissive state or the non-transmissive state every $1/120$ seconds.

14. The driving method of the liquid crystal shutter according to claim 9, wherein the second liquid crystal panel is switched to the non-transmissive state while the first liquid crystal panel is switched to the transmissive state, and the second liquid crystal panel is switched to the transmissive state while the first liquid crystal panel is switched to the non-transmissive state.

15. The driving method of the liquid crystal shutter according to claim 9, wherein the first and second liquid crystal panels are switched to the transmissive state or the non-transmissive state by turns in synchronous with each other.

16. An image display system, comprising:
   a liquid crystal shutter including;
      a first liquid crystal panel including a pair of electrode substrates and a liquid crystal layer held between the electrode substrates and covering a left eye sight, the first liquid crystal panel being switched between a transmissive state to pass incident light to left eye and a non-transmissive state to shut the incident light to the left eye,
      a second liquid crystal panel including a pair of electrode substrates and a liquid crystal layer held between the electrode substrates and covering a right eye sight, the second liquid crystal panel being switched between a transmissive state to pass incident light to the right eye and a non-transmissive state to shut incident light to the right eye, and a driving circuit to switch the first and second liquid crystal panels between the transmissive state and the non-transmissive state by turns by applying a voltage to the first and second liquid crystal panels, and to invert the voltage applied between the pair of the electrode substrates of the respective first and second liquid crystal panels at least once during a period in the transmissive state, and a display device to display an image for left eye and an image for right eye by turns;

wherein a three-dimensional image is displayed by a control of the driving circuit in which the driving circuit switches the first liquid crystal panel to the transmissive state, and the second liquid crystal panel to the non-transmissive state in synchronization to the displayed image for left eye, and switches the first liquid crystal panel to the non-transmissive state, and the second liquid crystal panel to the transmissive state in synchronization to the displayed image for right eye.

17. The image display system according to claim 16, wherein the driving circuit inverts the polarity of the voltage applied between the pair of the electrode substrates at least once during a period in the non-transmissive state for the first and second liquid crystal panels.

18. The image display system according to claim 16, wherein the liquid crystal layer is formed of the OCB (optically compensated bend) mode liquid crystal layer.

19. The image display system according to claim 18, wherein a driving voltage which switches the first liquid crystal panel to the transmissive state (ON) is smaller than that which switches the first liquid crystal panel to the non-transmissive state (OFF).

20. An image display system, comprising:

a liquid crystal shutter including;

a first liquid crystal panel including a pair of electrode substrates and a liquid crystal layer held between the electrode substrates and covering a left eye sight, the first liquid crystal panel being switched between a transmissive state to pass incident light to left eye and a non-transmissive state to shut the incident light to the left eye, a second liquid crystal panel including a pair of electrode substrates and a liquid crystal layer held between the electrode substrates and covering a right eye sight, the second liquid crystal panel being switched between a transmissive state to pass incident light to the right eye and a non-transmissive state to shut incident light to the right eye, and a driving circuit to switch the first and second liquid crystal panels between the transmissive state and the non-transmissive state by turns by applying a voltage to the first and second liquid crystal panels, and to invert a voltage applied between the pair of the electrode substrates of the respective first and second liquid crystal panels at least once during a period in the transmissive state, and a display device to display a first content image and a second content image by turns, wherein one of the first and second content images is displayed by a control of the driving circuit in which the driving circuit switches the first and second liquid crystal panels to the transmissive state in synchronization to one of the first content image display and the second content image display, and switches the first and second liquid crystal panels to the non-transmissive state in synchronization to the other of the first content image display and the second content image display.

21. The image display system according to claim 20, wherein the driving circuit inverts the polarity of the voltage applied between the pair of the electrode substrates at least once during a period in the non-transmissive state for the respective first and second liquid crystal panels.

22. The image display system according to claim 20, wherein the liquid crystal layer is formed of the OCB (optically compensated bend) mode liquid crystal layer.

23. The image display system according to claim 22, wherein the driving voltage which switches the first liquid crystal panel to the transmissive state (ON) is smaller than that which switches the first liquid crystal panel to the non-transmissive state (OFF).

24. A liquid crystal shutter comprising:

a first liquid crystal panel including a pair of electrode substrates and a liquid crystal layer held between first and second electrode substrates and covering a left eye sight, the first liquid crystal panel being switched between a transmissive state to pass incident light to left eye and a non-transmissive state to shut incident light to the left eye;

a second liquid crystal panel including a pair of electrode substrates and a liquid crystal layer held between the electrode substrates and covering a right eye sight, the second liquid crystal panel being switched between a transmissive state to pass incident light to the right eye and a non-transmissive state to shut incident light to the right eye; and a driving circuit to switch the first and second liquid crystal panels between the transmissive state and the non-transmissive state by turns by applying a first voltage to the first electrode substrate, and a second voltage to the second electrode substrate; wherein the first liquid crystal panel is in the transmissive state when the second liquid crystal panel is in the non-transmissive state, and the first liquid crystal panel is in the non-transmissive state when the second liquid crystal panel is in the transmissive state, and the first and second voltages are pulsed voltages, and the polarity of the first voltage and the second voltage are inverted at least once during a period in the transmissive state for the first and second liquid crystal panels.

25. The liquid crystal shutter according to claim 24, wherein the driving circuit inverts the polarity of the first and second voltages applied respectively to the first and second electrode substrates at least once during a period in the non-transmissive state for the respective first and second liquid crystal panel.

* * * * *